(12) United States Patent
Smith et al.

(10) Patent No.: US 9,986,275 B2
(45) Date of Patent: May 29, 2018

(54) SYSTEMS AND METHODS FOR SELECTING TELEVISION CONTENT INVENTORY AND PREDICTING AVAILABLE INVENTORY

(71) Applicant: Cox Enterprises, Inc., Atlanta, GA (US)

(72) Inventors: Bradley R. Smith, Manhasset, NY (US); Shereta Williams, Atlanta, GA (US); Ron Curtis, Dunwoody, GA (US); Lawrence Catchpole, Atlanta, GA (US)

(73) Assignee: COX MEDIA GROUP, LLC, Atlanta, GA (US)

( * ) Notice: Subject to any disclaimer, the term of this patent is extended or adjusted under 35 U.S.C. 154(b) by 0 days. days.

(21) Appl. No.: 15/216,035

(22) Filed: Jul. 21, 2016

(65) Prior Publication Data
US 2017/0026678 A1 Jan. 26, 2017

Related U.S. Application Data

(60) Provisional application No. 62/195,966, filed on Jul. 23, 2015.

(51) Int. Cl.
*H04N 21/2547* (2011.01)
*G06Q 30/02* (2012.01)
(Continued)

(52) U.S. Cl.
CPC ... *H04N 21/2547* (2013.01); *G06F 17/30905* (2013.01); *G06Q 10/087* (2013.01);
(Continued)

(58) Field of Classification Search
None
See application file for complete search history.

(56) References Cited

U.S. PATENT DOCUMENTS 6,820,277 B1 11/2004 Eldering
6,925,649 B2 8/2005 Schwalb et al.
(Continued)

FOREIGN PATENT DOCUMENTS

EP 1806693 7/2007

*Primary Examiner* — Hoang Vu A Nguyen BA
(74) *Attorney, Agent, or Firm* — Eversheds Sutherland (US) LLP

(57) ABSTRACT

Systems, methods, and computer-readable media are disclosed for optimizing selection of television advertising inventory. In one embodiment, a method may include receiving a set of available ad inventory from a traffic system server, where the set of available ad inventory is received from a hardware component in communication with the traffic system server. The method may include identifying a futuremost ad in the ad inventory representing an end of the first future time period, receiving a traffic system schedule indicative of planned television programming and historical television programming by the traffic system server, and determining that a correlation between a previous traffic system schedule portion selected from the historical television programming and the planned television programming meets an inventory prediction threshold. The method may include generating a first predicted advertisement inventory indicative of advertisement inventory at the traffic system server for a second future time period.

15 Claims, 8 Drawing Sheets

(51) Int. Cl.
*H04N 21/234* (2011.01)
*H04N 21/81* (2011.01)
*G06F 17/30* (2006.01)
*H04N 21/472* (2011.01)
*H04N 21/482* (2011.01)
*H04N 5/445* (2011.01)
*G06Q 10/08* (2012.01)

(52) U.S. Cl.
CPC ......... *G06Q 30/02* (2013.01); *G06Q 30/0272* (2013.01); *H04N 5/44543* (2013.01); *H04N 21/23424* (2013.01); *H04N 21/472* (2013.01); *H04N 21/47214* (2013.01); *H04N 21/482* (2013.01); *H04N 21/812* (2013.01)

(56) References Cited

U.S. PATENT DOCUMENTS

| | | | |
|---|---|---|---|
| 6,937,996 B1 | 8/2005 | Forsythe | |
| 6,985,882 B1 | 1/2006 | Del Sesto | |
| 7,222,099 B2 | 5/2007 | Forsythe | |
| 7,343,354 B2 | 3/2008 | Hennessey | |
| 7,574,404 B2 | 8/2009 | Forsythe | |
| 7,889,724 B2 | 2/2011 | Irvin | |
| 7,912,217 B2 | 3/2011 | Baugher et al. | |
| 8,302,030 B2 * | 10/2012 | Soroca | G06F 17/30749 705/14.45 |
| 2002/0007308 A1 | 1/2002 | Anderson | |
| 2003/0070167 A1 * | 4/2003 | Holtz | G06F 17/30017 725/32 |
| 2003/0079223 A1 * | 4/2003 | Galloway | G06Q 30/02 725/32 |
| 2004/0093286 A1 * | 5/2004 | Cooper | G06Q 10/087 705/28 |
| 2007/0143186 A1 * | 6/2007 | Apple | G06Q 30/02 705/14.48 |
| 2007/0157230 A1 | 7/2007 | Mardirossian | |
| 2007/0250895 A1 * | 10/2007 | Yamada | H04N 5/445 725/134 |
| 2007/0271134 A1 * | 11/2007 | Ferry | G06Q 30/02 705/14.61 |
| 2008/0119132 A1 * | 5/2008 | Rao | G06Q 30/02 455/3.04 |

* cited by examiner

SYSTEMS AND METHODS FOR SELECTING TELEVISION CONTENT INVENTORY AND PREDICTING AVAILABLE INVENTORY

CROSS-REFERENCE TO RELATED APPLICATIONS

This application claims the benefit of U.S. Provisional Application No. 62/195,966, filed Jul. 23, 2015, the entirety of which is hereby incorporated by reference.

BACKGROUND

Television advertising may be used by advertisers to present advertisements to potential consumers. Television advertisements may be presented during television programming at different times during a day. Some advertisers may desire to present advertisements during specific times of a day, which may result in increased competition for certain television advertising inventory and decreased competition for other television advertising inventory. Advertisers may desire to improve effectiveness of their advertising campaigns, while sellers of television advertising, such as television stations, may desire to sell additional television advertising inventory or to better correlate pricing of inventory to demand therefor. In some instances, advertisers may desire to serve advertisements to a certain number of viewers of a target audience.

Figure 1:
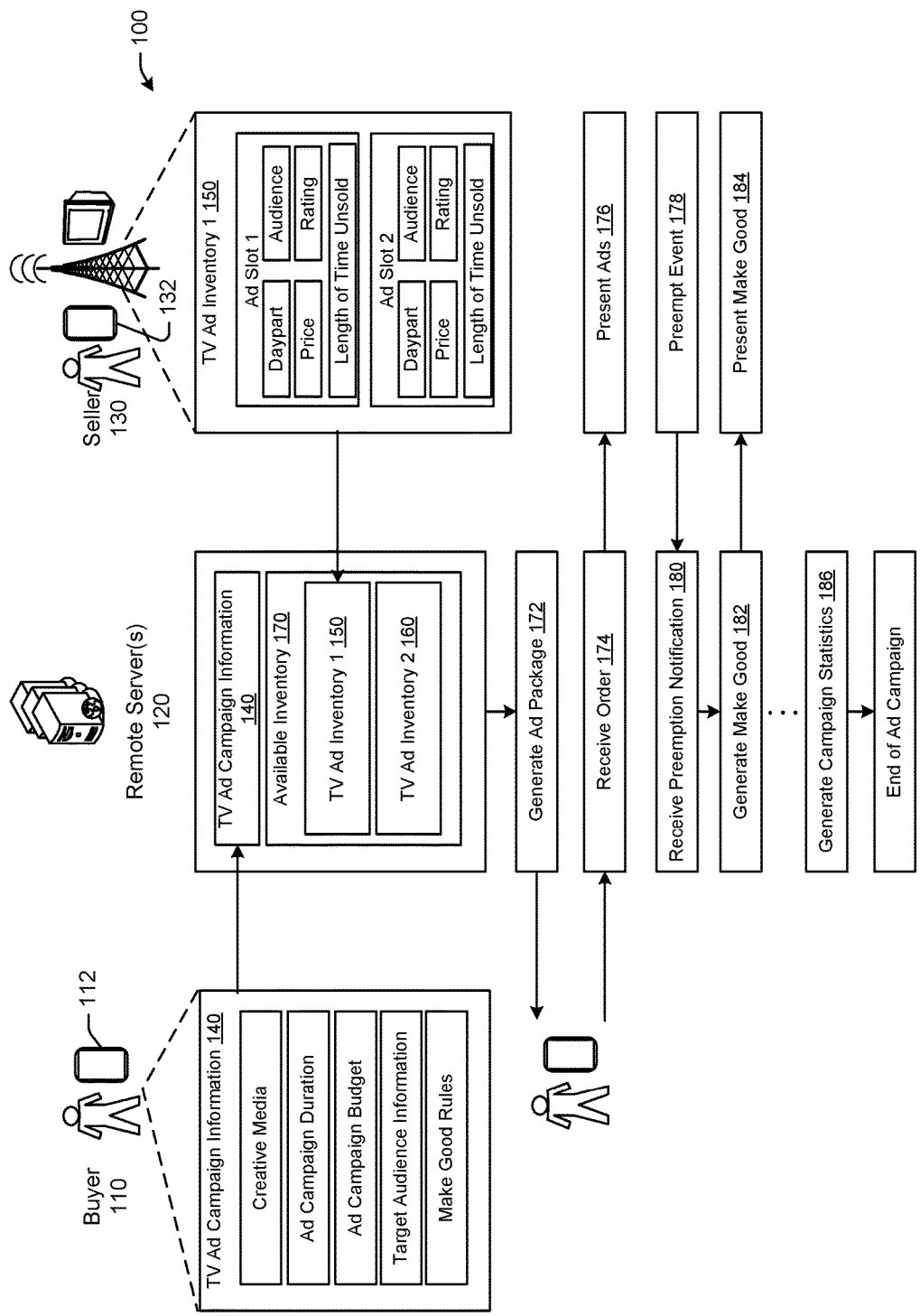
FIG. 1 is an illustrative process flow for optimizing selection of television advertising inventory in accordance with one or more example embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for optimizing selection of television advertising and content inventory. Sellers of television advertising, such as television stations, representatives, broadcasters, or third parties, may desire to sell available television advertising inventory. Buyers of television advertising, such as advertisers, agents, or third parties, may desire to purchase or otherwise acquire television advertising so as to satisfy goals or objectives of respective advertising campaigns. The systems and methods described herein may facilitate purchase or acquisition of television advertising inventory that optimizes or otherwise improves effectiveness of an advertising campaign by generating advertising packages that present ads to target consumers. The systems and methods described herein facilitate the sale of advertising inventory by, for example, generating advertising packages that include relatively desirable advertising inventory, as well as relatively less desirable inventory, such that a seller may sell additional advertising inventory. The systems and methods described herein may generate dynamic pricing for advertising packages reflective of advertising package contents, such that a likelihood that buyers and sellers of television advertising will accept the advertising package is increased.

Example embodiments of the disclosure relate to systems, methods, computer-readable media, techniques, and methodologies for optimizing both the sale and acquisition of available television advertising (ad) inventory by providing buyers with access to available ad inventory and related audience information generated by the systems and methods described herein. Based at least in part on seller traffic information, yield optimization information, and audience information, certain embodiments of the disclosure may optimize selection of television advertising inventory.

Referring to FIG. 1, an overview of an example environment 100 is depicted in accordance with one or more embodiments of the disclosure. The environment 100 may include a television advertising buyer 110 with a buyer device 112, a television advertising seller 130 with a seller device 132, and one or more remote server(s) 120 in communication with the buyer device 112 and the seller device 132. Either or both of the buyer device 112 and the seller device 132 may be a user device configured to communicate with the server 120, such as a mobile device, a server, a computer system, or another electronic device. In the environment 100, the buyer 110 may be any party desiring to purchase or otherwise acquire television advertising, such as an advertiser, an agent, a media buyer, a broker, or the like. The seller 130 may be any party desiring to sell available television advertising inventory, such as a media station, a representative, a third party, or another party.

Television advertising may include commercials and other advertisements that may be in video form and may be presented, delivered, or otherwise served to potential consumers during television programming or viewers of the television when the particular commercial is presented. Television ads may range anywhere from seconds to minutes, or even program-length.

Television advertising may have variable pricing and may be dependent, in part, on a daypart or a timeframe during a day in which an ad is to be served, a particular channel or media station at which an ad is to be served, programming at the time the ad is to be presented, viewership and viewership demographics during the time or program the ad is to be presented, competition for advertising during the time the ad is to be presented, a length of the ad, among other factors. For example, an ad presented during a primetime daypart, such as between 7:00 pm and 10:00 pm, may be relatively more expensive than ads presented during a late fringe daypart, such as between 12:00 am and 1:00 am. In another example, competition for television advertising during certain events, such as during an election season or the Super Bowl, may result in increased television advertising pricing and/or preemptions of certain advertising.

Dayparts may be different for different geographic regions and/or time zones and may be determined by individual sellers of television advertising or by industry practice. Timeframes for dayparts may likewise have lengths determined by individual sellers. For example, a daytime daypart may have a length of 6 hours or 4 hours, depending on the seller. Different dayparts may have different viewership both with respect to viewership numbers, as well as to audience composition. For example, primetime dayparts may have a relatively high number of viewers compared to an early morning daypart. Primetime dayparts may also have an audience composition that is different than an early morning daypart as well (e.g., different average age or age range, gender, household type, household income, consumers that have visited certain places in the past, certain types of consumers that make heavy purchases, etc.). Viewership of television programming or during particular dayparts may also be a factor in determining pricing for television ads. For example, viewership may be measured by third parties such as NIELSEN MEDIA RESEARCH®. Embodiments of the disclosure may generate packages of ad inventory for particular dayparts, for particular audiences (e.g., audiences with children, audiences of a particular income, etc.), for particular programming, and/or for particular blocks of programming categories (e.g., 1 hour block of comedy as opposed to particular shows, etc.), and the like.

Advertisers, such as the buyer 110, may create a television ad and may desire to place the ad on television via a targeted air time media buy that reaches a desired target audience and/or potential customers. Advertisers may desire to place an ad or serve an ad spot during a particular program, which may air at different times on different network affiliates, within the various media markets desired by the advertiser. For example, a syndicated show like Wheel of Fortune may appear on a CBS affiliate in Atlanta, and it may air on an ABC affiliate in Orlando. Different dayparts, television programming, media stations, and other factors may result in different viewership and/or audience composition. Accordingly, advertisers may desire to purchase television advertising inventory such that a target audience views the advertiser's ad.

Sellers of television advertising, such as the seller 130, may desire to sell all of the available television advertising inventory that is available, so as to maximize revenue or profits. For example, while relatively desirable television advertising inventory, such as during a primetime daypart, may be easy to sell, the seller 130 may have difficulty selling less desirable advertising inventory, such as during a late fringe daypart when viewership may be low.

Embodiments of the disclosure may optimize advertiser purchasing of television advertising, as well as selling of television advertising by sellers, by generating advertising packages that satisfy both advertiser goals of target audience, as well as seller goals of selling available inventory.

In the example environment 100 of FIG. 1, one embodiment of the systems and methods described herein is illustrated. The buyer 100 may generate a television advertising (ad) campaign, and may generate television advertising information 140. The television advertising information 140 may include creative media, such as video content associated with the ad campaign, an ad campaign duration indicative of a length of the ad campaign (which may include start and/or end dates and other chronological information), an ad campaign budget indicative of a total budget the advertiser desires to spend on television advertising impressions for the ad campaign, target number of ad impressions for the advertising campaign, target audience information, and a set of one or more make good rules. The target audience information may include information related to types of consumers the advertiser desires to reach, such as ages or age ranges, gender, profession, personality type (e.g., athletic, sports fan, etc.), ethnicity, a total number of viewers, household income levels, a household type (e.g., single, married, children, etc.), and other information indicative of the advertiser's determined target consumer. The make-good rules may include rules that facilitate substituting ad slots the buyer 110 has purchased that have been preempted by another advertiser's ad, as described herein. In other embodiments, the make-good rules may include rules that facilitate the generation of additional ad slots (also known as ad avails) when the ad slots that the buyer 110 has purchased provided fewer than the bargained for number of ad impressions.

The buyer 110 via the buyer device 112 may generate a request for available advertising inventory and may send the request to the server 120. The server 120 may receive the request and may generate, in response to the request, a set of available advertising inventory. The server 120 may be in communication with one or more sellers of television advertising, such as the seller 130. The server 120 may receive or request available television advertising inventory from each connected seller. The server 120 may be configured to receive or actively request advertising inventory and other data periodically (e.g., hourly, daily, etc.) from traffic data associated with sellers 130, or from sellers 130 directly. The connected sellers may send the server 120 a set of available advertising (ad) slots that are available for purchase. For example, the seller 130, independently or in response to a request from the server 120, may generate television ad inventory 150. The television ad inventory 150 may include a set of one or more available ad slots available for purchase, as well as ad slot information for each ad slot. The available ad slot information may include timing or daypart information, programming information during which the ad will be presented, pricing information, rating information, audience information, length of time duration for the ad slot (e.g., 15 seconds, 30 seconds, 60 seconds, etc.), or other information associated with each available ad slot. Other embodiments may include additional or less ad slot information.

The seller 130 may send the available advertising inventory 150 to the server 120. The server 120 may receive the available advertising inventory 150, as well as additional available advertising inventory 160 from another seller, such as a different media station. Based at least in part on the received available advertising inventory 150, 160, the server 120 may generate aggregate available inventory 170. The aggregate available inventory 170 may be searchable by the buyer 110 or associated media planners.

For one or more ad slots of the aggregate advertising inventory 170, the server 120 may generate pricing associated with some or all of the available advertising inventory 170. Pricing may be based at least in part on pricing information provided by the respective sellers and/or on forecasted ratings information. In some embodiments, the server 120 may generate ratings associated with some or all of the available advertising inventory, which may include ratings shares for demographic groups, as discussed herein. For example, the server 120 may generate NIELSEN™ or viewership data associated with ad slots previously shown.

In addition to the ad campaign information 140, the buyer 110 may provide one or more inputs to the server 120 indicative of advertising the buyer 110 desires to purchase. The inputs may include preferences regarding media stations, programming, and/or desired audience demographics, for example.

Based at least in part on the ad campaign information 140 and any other inputs provided by the buyer 110, the server 120 may generate an advertising package 172. The advertising package 172 may include a set of one or more ad slots selected from the available inventory 170, the one or more ads selected based at least in part on the ad campaign information 140, as well as pricing, ratings, audience information, and other information. The server 120 may be configured to generate advertising packages based at least in part on a number of impressions desired by the buyer 110. The server 120 may be configured to generate advertising packages based at least in part on target audience information desired by the buyer 110. The server 120 may be configured to generate suggestions of advertising inventory for a buyer to purchase based at least in part on target audience information. For example, the server 120 may determine audience information from a selected daypart to match audience information of another daypart or program.

The advertising package may include ad slots that match or correspond to some or all of the buyer's selections, and may also include ad slots that do not match some or any of the buyer's selections. In one embodiment, the advertising package may include an ad slot that has been unsold for a threshold length of time, such as 4 days, 2 weeks, 1 month, etc., or that have been determined are historically difficult to sell. The server 120 may include certain ad slots in the advertising package 172 that have been unsold for a threshold length of time, such as several days, weeks, or months, that may indicate the seller is having difficulty selling the particular ad slot. The server 120 may therefore assist the seller in selling relatively less desired inventory. Because the ad slot has been unsold or has otherwise been available for the threshold length of time, the ad slot may be in a daypart or on a day or during programming that is undesirable to buyers.

Embodiments of the disclosure may stitch together a national or regional campaign from numerous disparate advertising systems. For example, an advertiser could submit a proposal to reach 18-34 year old women, in Ohio, Illinois, Indiana, Kentucky, Idaho and Nevada, and embodiments of the disclosure may automatically stitch together such a campaign into a single proposal for an advertiser, without regard to programming, network affiliation or anything other than the demos of the target audience and requisite audience size.

In selecting a particular ad slot that has been available for the threshold length of time, the server 120 may select an optimal or best ad slot as determined based on the ad campaign information 140. For example, the server 120 may generate a set of ad slots that have been available for the threshold length of time. The server 120 may identify optimal ad slots from the set of ad slots that have been available for the threshold length of time, based at least in part on the specifics of the buyer's ad campaign and ad campaign information. For example, the server 120 may determine the ad slot that has an associated audience that corresponds to, or most closely corresponds to, the buyer's target audience.

The server 120 may generate aggregate information across all of the ad slots included in the advertising package 172. The advertising package 172 may include additional information, such as a clearance percentage, historical performance, present performance, and other information. The server 120 may send the ad package 172 to the buyer 110.

The buyer 110 may receive the ad package 172 from the server 120. The ad package 172 may be a proposal and the server 120 may accept counteroffers or requests to modify the ad package 172. The buyer 110 may accept all of, or a portion of, the advertising package 172. In FIG. 1, the buyer 110 may accept the ad package 172 and may order the ad package. The server 120 may receive the order 174 of the ad package 172 and may facilitate presenting or serving of ads associated with the ad campaign 140 by sending creative material or other information to the sellers for which ad slots were included in the ad package 172.

The sellers, for example seller 130, may receive an indication from the server 120 regarding ad slots that were included in the ad package 172 and sold to the buyer 110. The ads 176 may be presented or served in the respective ad slots.

In some instances, another advertiser may offer the seller 130 a higher price for an ad slot that was previously sold and/or allocated to a party, such that the originally scheduled ad is preempted by the higher paying advertiser. For example, during an election season, parties may be willing to pay additional amounts to present ads associated with their campaign. The seller 130 may agree to accept the increased price for the ad slot. However, since the ad slot was already assigned or allocated to a different party or ad, the original ad is preempted by the replacement ad.

Embodiments of the disclosure may facilitate identification of true market pricing for television ad slots. True market pricing may be affected by seasonal or cyclical events, such as political advertising during elections, sports events, and other high demand events. Make goods may allow sellers to initially underprice advertising inventory to ensure sales, while later identifying true market pricing, for example, in instances where demand has increased dramatically. In one example, for political advertising, ad slots leading up to an election may have enormous value, while after the election they have no value to the political advertiser. Such time sensitive advertising may result in preemptions, which may be followed by make goods after the election because those ad slots still have value to the national, regional or local advertiser, but not to the political advertiser. Accordingly, while an ad slot may be of relatively high value to a first buyer, the same ad slot may be of relatively low value to a second buyer. In FIG. 1, a first buyer may purchase the underpriced advertising inventory, and a second buyer or advertiser may offer more for the same inventory at a later in point in time, which may result in preemption of the first buyer's ads. To compensate the first buyer, a make good may be provided for each ad that is preempted. The server 120 may generate make good suggestions based at least in part on factors such as target audience, pricing, daypart, programming, and the like. In some embodiments, a proposed make good may include two-for-one ad impressions to compensate the preempted buyer.

In FIG. 1, a preempt event 178 may occur. The seller 130 may desire to provide the buyer 110 with a substitute ad slot to compensate for the preempted ad slot. The seller 130 may send the server 120 a preemption notification 180. The server 120 may receive the preemption notification 180 and, based at least in part on the make good rules of the ad campaign information 140, the server 120 may generate a make good 182 that includes an alternate advertising slot at which the original ad can be presented. The make good 182 may be determined based at least in part on available inventory, timing/daypart, audience information, desired audience information, pricing, or other factors. In some instances, for example when the buyer 110 desires to reach a certain number of viewers, the server 120 may generate a make good that includes two or more ad slots that replace a single preempted ad slot.

The seller 130 may receive the make good 182 and may present the preempted ad 184 at the make good ad slot or slots. In some instances, the seller 130 may present a counteroffer to the initial make good 182 received from the server 120. The server 120 may continue to generate make goods for preempted ad for the buyer's 110 ad campaign without further input from the buyer 110. Upon completion of, or during, the ad campaign, the server 120 may generate statistics for the ad campaign, such as actual audience information, total pricing, preemption statistics, and other information and may send the statistics to the buyer 110 and/or seller 130.

Accordingly, the systems, methods, computer-readable media, techniques, and methodologies described herein may optimize selection of television advertising inventory. One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings. The techniques are described below with reference to the following devices and processes. However, it is to be appreciated that a number of other devices may also employ these techniques.

Example embodiments of the disclosure can provide a number of features and/or technical effects. For example, in accordance with example embodiments of the disclosure, the systems and methods described herein may facilitate searching of available advertising inventory, searching of available audiences, ordering media, optimizing yields for ad campaigns, rating inventory and wrap protections, monitoring performance and yields, and routing orders. It should be appreciated that the above examples of features and/or technical effects of example embodiments of the disclosure are merely illustrative and not exhaustive.

While FIG. 1 illustrates one example system for implementing the disclosed techniques, it is to be appreciated that multiple other devices and architectures may implement the described techniques. Moreover, the operations described above for the system shown in FIG. 1 are not limiting and many variations and/or additional functions of the described system are contemplated within the scope of this disclosure.

Illustrative Processes

Figure 2:
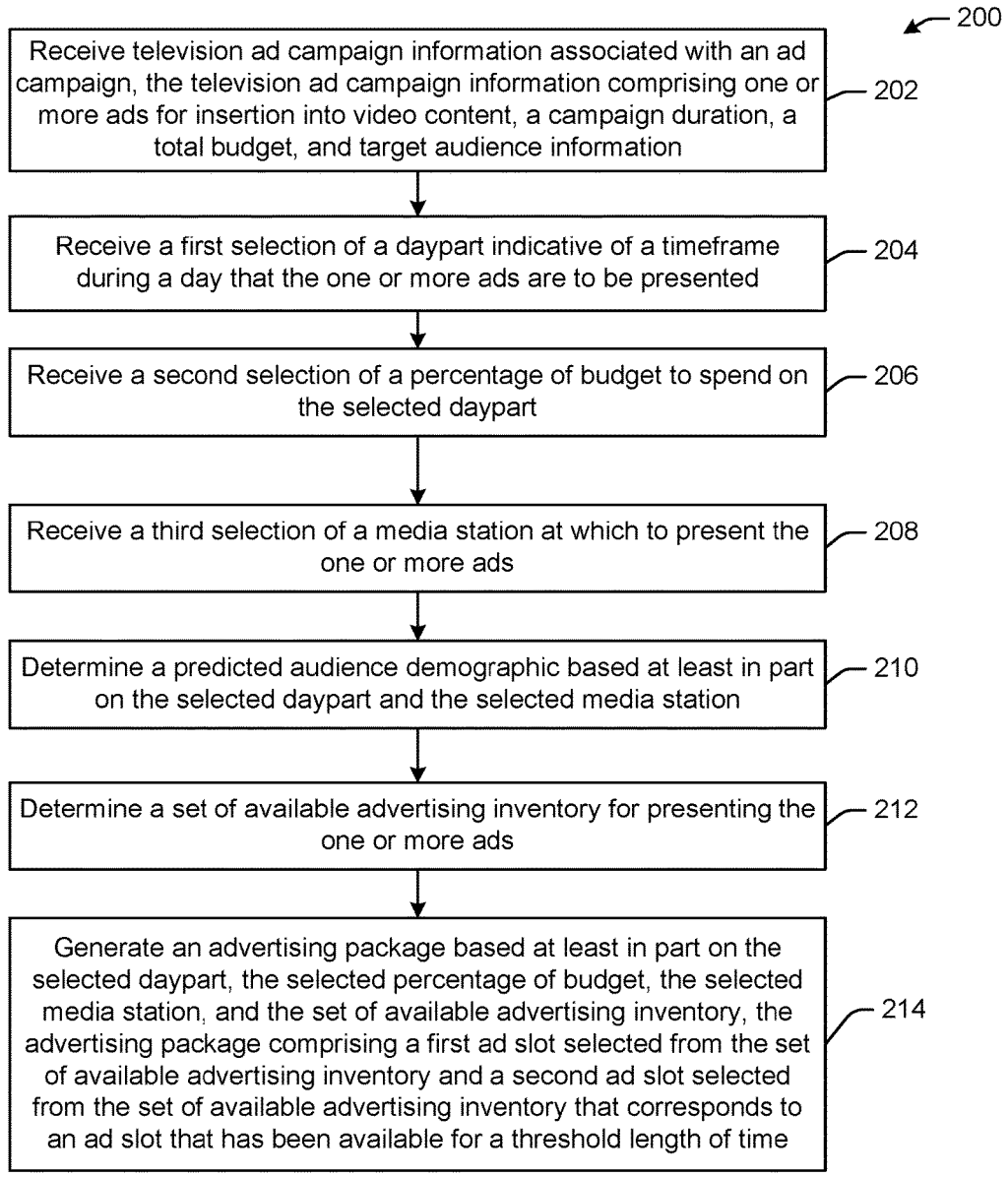
FIG. 2 is an example method for optimizing selection of television advertising inventory in accordance with one or more example embodiments of the disclosure.

FIG. 2 depicts an illustrative process or method 200 for optimizing selection of television advertising inventory in accordance with one or more embodiments of the disclosure, and will be discussed in conjunction with the schematic illustrations of FIG. 3. In example embodiments, the method 200 may be performed to generate an advertising package for a buyer. While the operations of method 200 may be described in the illustrative context of a buyer, it should be appreciated that the method 200 is more broadly applicable to other parties such as advertisers, sellers, media stations, and other parties. The method 200 may be performed, in one example, by the specific server 120 of FIG. 1.

In FIG. 2, block 202 of the method 200 includes receiving, for example by the server 120, television ad campaign information associated with an ad campaign, the television ad campaign information comprising one or more ads for insertion into video content, a campaign duration, a total budget, and target audience information. Other embodiments may include different information, more information, or less information.

At block 204, the method 200 includes receiving a first selection of a daypart indicative of a timeframe during a day that the one or more ads are to be presented. In other embodiments, the first selection may be a desired television program, a syndicated program that runs at different times and on different network affiliated stations in different markets, or other selections instead of a daypart. At block 206, the method 200 includes receiving a second selection of a percentage of budget to spend on the selected daypart. At block 208, the method 200 includes receiving a third selection of a media station at which to present the one or more ads. In some embodiments, an advertiser may be indifferent to a particular station on which ad spots are served, and instead may be concerned with the show or program against which ad spots are served, or the demographics for the viewers.

In one example, a buyer may initiate a request for available ad inventory or for an advertising package from the server 120 by providing ad campaign information to the server 120. Ad campaign information may include a start date for the ad campaign, an end date for the ad campaign, a duration of the ad campaign, a product type indicating a subject of the ad campaign, a total budget for the ad campaign or for the server 120 to spend, ad information such as spot length, target audience information such as desired audience demographics (e.g., gender, age, etc.), impression goals such as a minimum, a maximum, and/or a target impression goal, desired household type, a cost per point goal, a cost per thousand goal, as well as other information.

The buyer may further select one or more desired dayparts, days and/or programs during which ads associated with the ad campaign may be presented. The buyer may select percentages of budget and/or impressions to be delivered in each selected daypart and/or day. The buyer 110 may select specific timeframes, such as weeks or months, during which impressions of the ad campaign may be presented. The buyer may select one or more media stations or programs at which the buyer desires to deliver impressions of the ad campaign. The buyer may select markets or regions to determine what media stations are available. The buyer 110 may provide a set of one or more rules regarding make goods. The set of one or more rules may include a tolerance for certain aspects of substitute ad slots for preempted ads.

The server 120 may receive the ad campaign and related information and selections indicated by the buyer. The server 120 may determine available advertising inventory based at least in part on the ad campaign information. For example, the server 120 may determine availability at the selected media stations and/or during the selected dayparts.

Block 210 includes determining a predicted audience demographic based at least in part on the selected daypart and the selected media station, the predicted audience demographic representative of consumers of the selected media station during the selected daypart. The server 120 may analyze rating information, historical data, programming content or context information, or other information to determent the predicted audience demographic.

Block 212 includes determining a set of available advertising inventory for presenting the one or more ads, the set of available advertising inventory comprising at least one ad slot that is available during the selected daypart. The server 120 may identify available advertising (ad) slots that match or correspond to the buyer selections and target criteria. In some embodiments, the server 120 may determine a ranking of the set of available advertising inventory based at least in part on a length of time each respective ad slot has been available or the historical demand for that ad slot.

Figure 3:
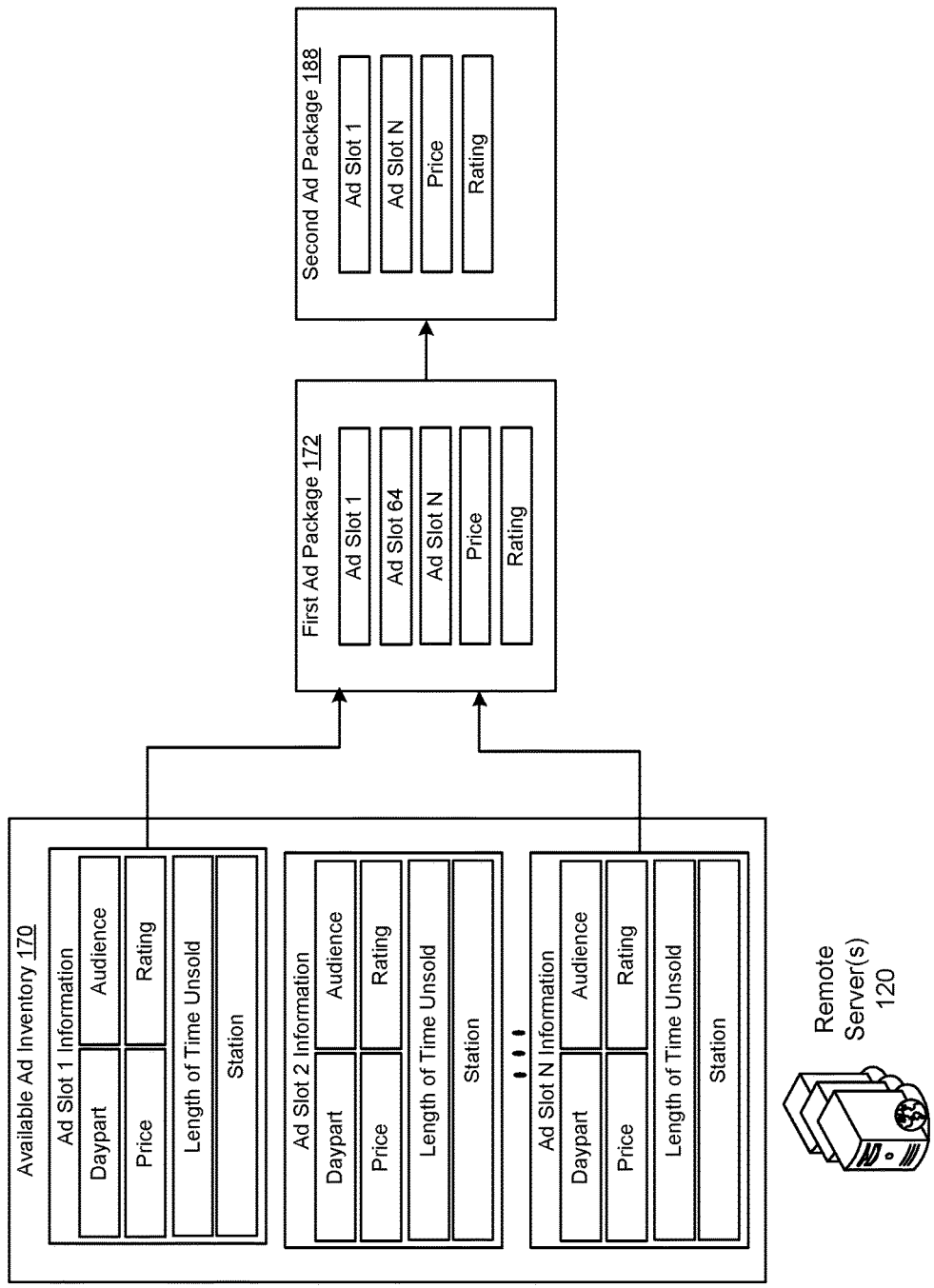
FIG. 3 is a schematic illustration of an example functionality provided by a system in accordance with one or more embodiments of the disclosure.

For example, in FIG. 3, the server 120 may analyze available ad inventory 170 and the ad slot information, such as daypart, audience, price, rating, unsold time, media station, and other information to determine ad slots that correspond to at least part of the advertiser's goals or selections. Based at least in part on the advertiser's goals or selections and the ad slot information for the available ad slots, the server 120 may identify available ad slots, which the advertiser may be interested in purchasing.

At block 214, the method 200 includes generating a first advertising package based at least in part on the selected daypart, the selected percentage of budget, the selected media station, and the set of available advertising inventory, the first advertising package comprising a first ad slot selected from the set of available advertising inventory that corresponds to the selected daypart, the selected percentage of budget, and the selected media station, and a second ad slot selected from the set of available advertising inventory that corresponds to an ad slot that has been available for a threshold length of time. The first ad slot may be a top ranked ad slot of the ranking of the set of available advertising inventory. The second ad slot may be a bottom ranked ad slot of the ranking of the set of available advertising inventory.

The server 120 may generate an advertising package based at least in part on the identified available ad inventory. The advertising package may be a proposed package of one or more available ad slots that the buyer may purchase, and may include additional information such as a rating of the ad slots, in aggregate or individually, included in the package, as well as pricing information for the package. In FIG. 3, the server 120 may, for example, identify that ad slot 1, ad slot 64, and another ad slot N correspond to some or all of the advertiser's goals or selections and may generate the first ad package 172 that includes the identified ad slots, a price for the ad package, and rating information. In another embodiment, the server 120 may present alternative ad packages that meet the advertiser's goals. For example, an advertiser may simply desire to serve an ad spot to a certain number of viewers of a certain demographic. The server 120 may generate several ad packages, with different prices, each of which may meet the advertiser's requirements. The advertiser may select a desired ad package, or may pick and choose elements from within the packages to present as a counter offer, which the server 120 may evaluate for availability pricing.

The server 120 may generate a price associated with the first advertising package based at least in part on the selected daypart, the selected percentage of budget, the selected media station, and the set of available advertising inventory. The server 120 may generate a deadline for acceptance of the advertising package, which may also indicate a deadline for the pricing. The acceptance deadline may be indicative of a time until which the price is valid. The server 120 may send the price, the acceptance deadline, and the first advertising package to a user device associated with a buyer.

Pricing for subsequent advertising packages may be based at least in part on advertising packages previously purchased by a certain buyer. For example, based on a buyer's purchase history, the server 120 may determine which ad slots the buyer prefers, and may include such ad slots in subsequent advertising packages and may also increase the price of the package.

In some embodiments, the server 120 may determine a rating for the first advertising package by comparing the target audience information to the predicted audience demographic. The rating may be a Nielsen rating or average Nielsen rating for all of the ad slots. The server 120 may guarantee the rating by presenting ratings corresponding to the timeframe in which the ad impressions are to be served, for example.

The buyer may receive the advertising package and related information and may generate a counter-proposal by selecting and/or excluding one or more ad slots from the advertising package, or by providing an alternate price. The ad slots that have been available for the threshold length of time may not be excludable by the buyer in some embodiments, while in other embodiments, the buyer may exclude any ad with a resultant increase in price. The buyer may also exclude certain programs from the advertising package that the buyer does not want ad impressions to be served during. Similarly, the buyer can select a program during which ad impressions will always be served. For example, in FIG. 3, the advertiser may receive the first ad package 172 and may decide to exclude ad slot 64. In some embodiments, if ad slot 64 is non-excludable (e.g., undesired inventory that must be included with premium inventory), the server 120 may deny the modification.

The server 120 may receive a package modification request indicative of a request to modify the first advertising package. The package modification request may include one or more modification requests or counteroffers to the first advertising package. The package modification request may include a first request to select the first ad slot for presenting the one or more ads, and a second request to exclude the second ad slot from the first advertising package. The server 120 may evaluate the modifications and send an approval notification indicative of approval of the first request, or acceptable modifications, and a denial notification indicative of denial of the second request, or unacceptable modifications. For example, the server 120 in FIG. 3 may receive a request to remove ad slot 64 from the ad package 172. The server 120 may accept the proposed modification and may generate a second ad package 188 without the ad slot 64. The price and/or rating may be modified as a result.

If the server 120, prior to receiving an acceptance notification for the ad package, determines that the first ad slot is no longer available. In response, the server 120 may generate a second advertising package with the second ad slot and may send a cancelation notification to the buyer indicating the first advertising package is no longer available, along with the second advertising package.

The buyer may accept the ad package, either the first, or the second if applicable, and may send a notification to the server 120 with a final order. In response, the server 120 may send the one or more ads to the selected media station for presenting during the selected daypart.

An example method may include receiving television ad campaign information associated with an ad campaign, where the television ad campaign information includes one or more ads for insertion into video content, a campaign duration, a total budget, and target audience information, and/or target programming. The method may include receiving a first selection of a daypart, which may be driven by programming or audience demographics, indicative of a timeframe during a day that the one or more ads are to be presented, and receiving a second selection of a percentage of budget to spend on the selected daypart. The method may include receiving a third selection of a media station at which to present the one or more ads. The media station may be a network affiliate or particular program, and may include a particular station in a desired market as well as a network affiliate in a desired market, or stations airing a desired show in desired markets. The method may include determining a predicted audience demographic based at least in part on the selected daypart and the selected media station, the predicted audience demographic representative of consumers of the selected media station during the selected daypart, and determining a set of available advertising inventory for presenting the one or more ads, the set of available advertising inventory including at least one ad slot that is available during the selected daypart. The method may include generating a first advertising package based at least in part on the selected daypart, the selected percentage of budget, the selected media station, and the set of available advertising inventory, the first advertising package including a first ad slot selected from the set of available advertising inventory that corresponds to the selected daypart, the selected percentage of budget, and the selected media station, and a second ad slot selected from the set of available advertising inventory that corresponds to an ad slot that has been available for a threshold length of time.

In some embodiments, the method may further include determining a ranking of the set of available advertising inventory based at least in part on a length of time each respective ad slot has been available, where the first ad slot is a top ranked ad slot of the ranking of the set of available advertising inventory. The second ad slot may be a bottom ranked ad slot of the ranking of the set of available advertising inventory. The method may further include determining a rating for the first advertising package by comparing the target audience information to the predicted audience demographic. The method may further include sending the first advertising package to a user device associated with a buyer, and receiving a package modification request indicative of a request to modify the first advertising package. The package modification request may include a first request to select the first ad slot for presenting the one or more ads, and a second request to exclude the second ad slot from the first advertising package. The method may include sending an approval notification indicative of approval of the first request, sending a denial notification indicative of denial of the second request, and sending the one or more ads to the selected media station for presenting during the selected daypart. The method may include generating a price associated with the first advertising package based at least in part on the selected daypart, the selected percentage of budget, the selected media station, and the set of available advertising inventory, generating an acceptance deadline associated with the price, the acceptance deadline indicative of a time until which the price is valid, and sending the price, the acceptance deadline, and the first advertising package to a user device associated with a buyer. In some embodiments, prior to receiving an acceptance notification, the method may include determining that the first ad slot is no longer available, generating a second advertising package including the second ad slot, sending a cancelation notification to the user device indicating the first advertising package is no longer available, and sending the second advertising package to the user device.

The server 120 may be configured to generate statistics for an ad campaign by monitoring and storing preemption events for ads that were to be served during a particular daypart and/or program and were preempted. The server 120 may further monitor and store impression delivery events, scheduled impression delivery events, and the like. Yield optimization may be based at least in part on inventory at stations, demand for available inventory, and/or pricing of competitive ad slots by different stations. In some embodiments, the server 120 may be configured to generate real time campaign performance metrics or statistics and report to the advertiser and/or to the stations.

Figure 4:
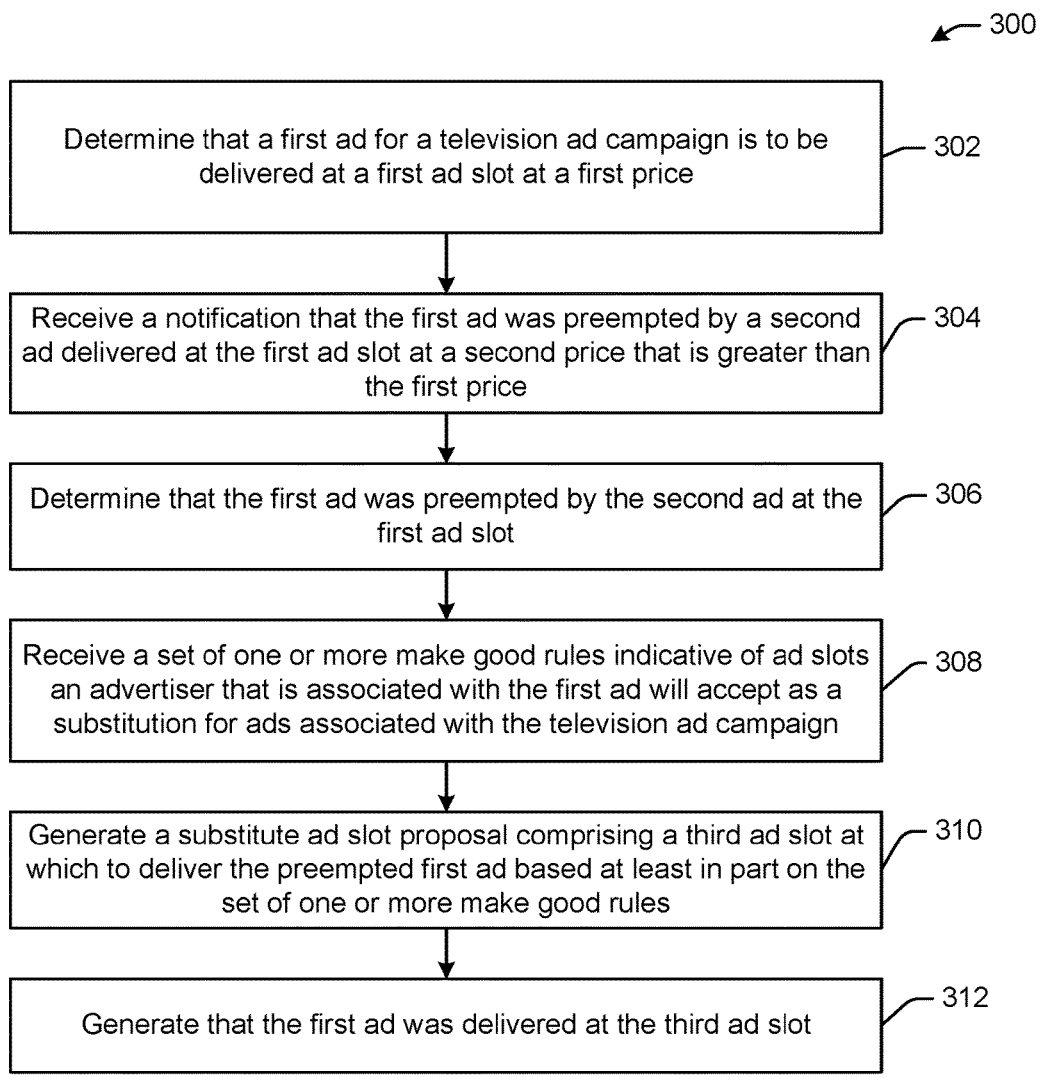
FIG. 4 is an example method for optimizing selection of television advertising inventory in accordance with one or more example embodiments of the disclosure.
Figure 5:
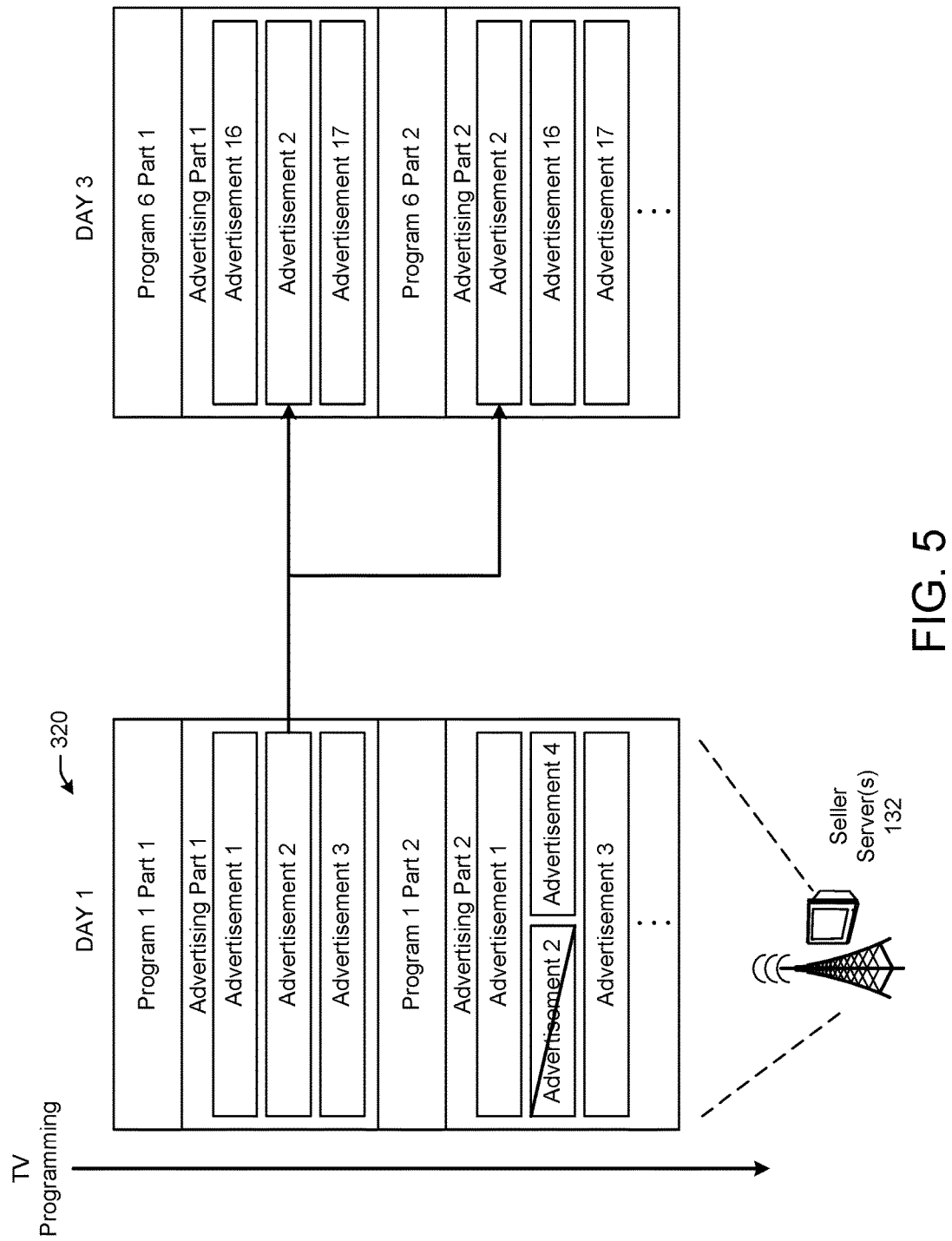
FIG. 5 is a schematic illustration of an example functionality provided by a system in accordance with one or more embodiments of the disclosure.

Referring to FIGS. 4 and 5, as discussed herein, ads for delivery in certain ad slots may be preempted by other ads. FIG. 4 depicts an illustrative process or method 300 for optimizing selection of television advertising inventory in accordance with one or more embodiments of the disclosure, and will be discussed in conjunction with the schematic illustrations of FIG. 4. While the operations of method 300 may be described in the illustrative context of a buyer, it should be appreciated that the method 300 is more broadly applicable to other parties such as advertisers, sellers, media stations, and other parties. The method 300 may be performed, in one example, by the specific server 120 of FIG. 1.

Block 302 of the method 300 includes determining that a first ad for a television ad campaign is to be delivered at a first ad slot at a first price.

Block 304 of the method 300 includes receiving a notification that the first ad was preempted by a second ad delivered at the first ad slot at a second price that is greater than the first price. In some embodiments, the server 120 may receive a request to preempt the first ad by delivering a second ad at the first ad slot at a second price that is greater than the first price, and may approve or facilitate preemption of the first ad. For example, in FIG. 5, a media station 320 may be presenting programming during day 1. The program may be segmented with advertising breaks in between. In between part 1 and part 2 of a program, advertisements 1, 2, and 3 may be scheduled for presentation. The same advertisements may be scheduled for presentation after part 2 of the program as well. However, advertisement 2 may be preempted by, for example, advertisement 4.

Block 306 of the method 300 includes determining that the first ad was preempted by the second ad at the first ad slot. In FIG. 5, the server may determine that advertisement 2 was preempted by advertisement 4 during the advertising break after part 2 of program 1.

Block 308 of the method 300 includes receiving a set of one or more make good rules indicative of ad slots an advertiser that is associated with the first ad will accept as a substitution for ads associated with the television ad campaign. For example, an advertiser may only accept show-for-show make goods, or make goods during another episode or presentation of a specific show, or only certain dayparts, or other rules. Make good rules may be received with initial campaigns but may not be applied until necessary (e.g., when a preemption event occurs).

Block 310 of the method 300 includes generating a substitute ad slot proposal comprising a third ad slot at which to deliver the preempted first ad based at least in part on the set of one or more make good rules. The server may generate substitute ad slot proposals based on a number of factors. For example, the server may determine an expected viewership of the preempted ad slot, an expected rating of the preempted ad slot, an expected audience demographic of the preempted ad slot, or another factor, and may generate the substitute ad slot proposal based at least in part on the expected viewership. In some instances, the substitute ad slot may include more than one ad slot, such as two ad slots selected such that combined viewership in the desired demographic of the ad slots are substantially equal to the expected viewership of the preempted ad slot. The server may determine, in some embodiments, a daypart exchange rate based at least in part on competition and/or viewership of programming during certain dayparts. For example, a primetime daypart may be exchanged for 10 early morning dayparts.

In FIG. 5, the server may determine that during program 1, advertisement 2 would have been presented to one million viewers between the ages of 18-24. The server may generate a proposed make good during program 6, several days after the preemption event, where advertisement 2 is to be presented twice to reach about one million viewers during the commercial breaks therein.

Block 312 of the method 300 includes determining that the first ad was delivered at the third ad slot. In FIG. 5, the server may determine that advertisement 2 was served during the agreed upon make good slots.

An example make good determination method may include determining that a first ad for a television ad campaign is to be delivered at a first ad slot at a first price, receiving a notification that the first ad was preempted by a second ad delivered at the first ad slot at a second price, determining that the first ad was preempted by the second ad at the first ad slot, and receiving a set of one or more make good rules indicative of ad slots an advertiser that is associated with the first ad will accept as a substitution for ads associated with the television ad campaign. The method may include generating a substitute ad slot proposal including a third ad slot at which to deliver the preempted first ad based at least in part on the set of one or more make good rules, and determining that the first ad was delivered at the third ad slot.

In some embodiments, the method may include receiving a request to preempt the first ad by delivering a second ad at the first ad slot at a second price. The method may include determining an expected viewership of the first ad slot, and generating the third ad slot based at least in part on the expected viewership. The substitute ad slot may include the third ad slot and a fourth ad slot selected such that combined viewership of the third ad slot and the fourth ad slot are substantially equal to the expected viewership. The method may include determining an expected rating of the first ad slot, and generating the third ad slot based at least in part on the expected rating. The method may include determining an expected audience demographic of the first ad slot, and generating the third ad slot based at least in part on the expected audience demographic.

The systems and methods described herein may facilitate searching of available advertising inventory, searching of available audiences, ordering media, optimizing yields for ad campaigns, rating inventory and wrap protections, monitoring performance and yields, and routing orders.

It should be noted, that the method 300 may be modified in various ways in accordance with certain embodiments of the disclosure. For example, one or more operations of method 300 may be eliminated or executed out of order in other embodiments of the disclosure. Additionally, other operations may be added to method 300 in accordance with other embodiments of the disclosure.

The above described example determinations are merely examples and the implementations of the techniques disclosed herein are not so limited. As would be understood by one of ordinary skill in the art in view of this disclosure, any number of variations or alternative determination may be used without departing from the scope of this disclosure.

Illustrative Device Architecture

Figure 6:
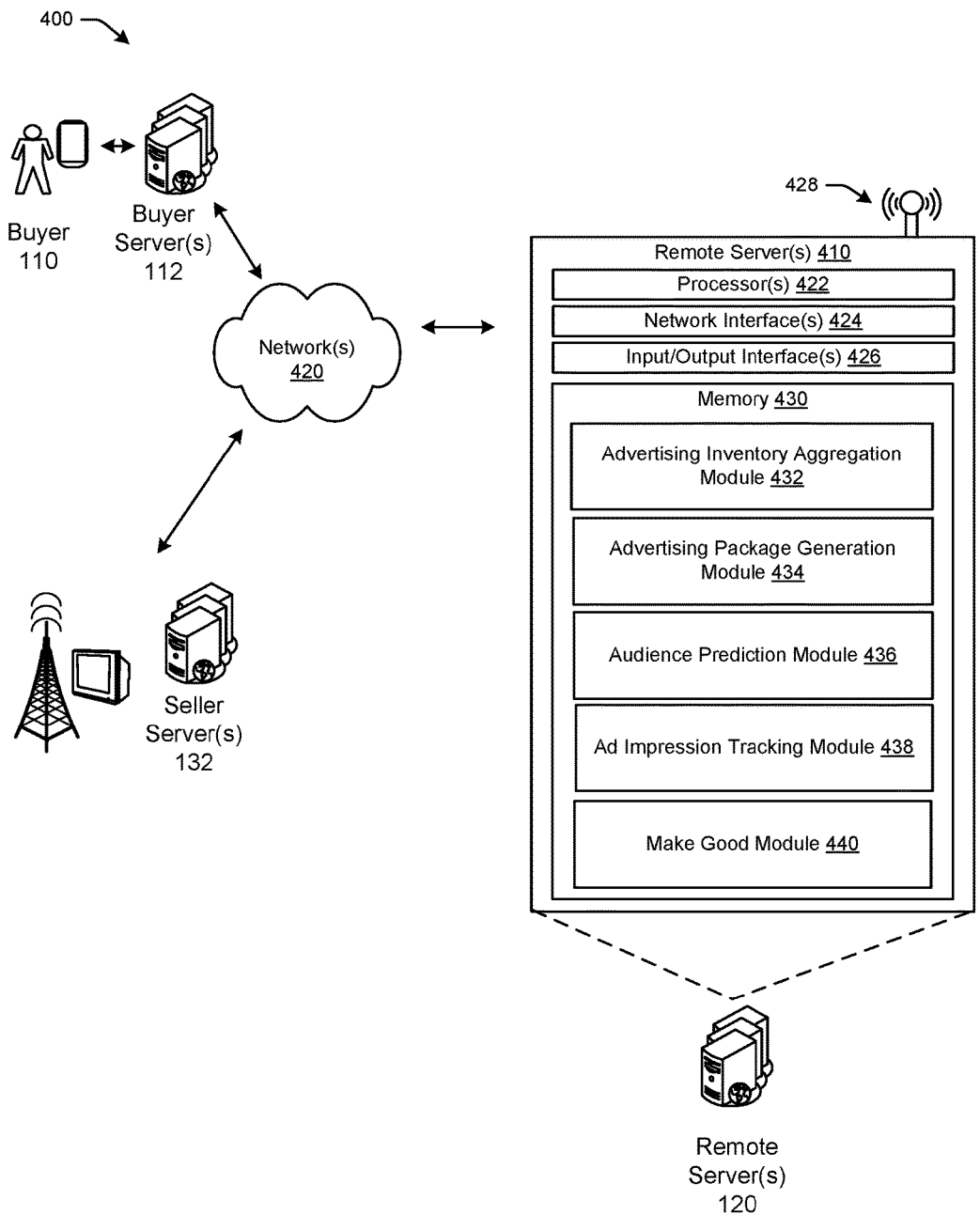
FIG. 6 is a schematic illustration of an example system architecture in accordance with one or more example embodiments of the disclosure.

FIG. 6 is a schematic illustration of the example server 120 of FIG. 1 operating in an example network environment 400 in accordance with one or more example embodiments of the disclosure. Although described herein in the context of server 120, one or more components of the server 120 or operations of methods described herein may be performed partially or entirely by another device. The server 120 may be in communication with the remote server 410 via one or more networks 420. The server 120 may be any suitable user device including, but not limited to, an electronic device such as a smartphone, tablet, e-reader, or the like; a desktop computer; a laptop computer, a game console, a personal media player, a wearable computer device, and so forth. The server 120 may interact with the buyer and seller servers 112, 132.

As illustrated, the server 120 may include one or more processor(s) 422, one or more network interface(s) 424, one or more input/output ("I/O") interface(s) 426, an antenna 428, and a memory 430. The server 120 may also include various additional components, such as one or more input device(s), configured to interact with the I/O interface 426, that allow the buyer 110 to operate the server 120. The server 120 may also include an operating system configured to provide an interface between software and hardware resources of the server 120, and/or database management systems configured to support functionality of the memory 430. The server 120 may include system busses that functionally couple various components of the server 120. In other embodiments, the server 120 may include additional or fewer components.

The processor(s) 422 may be configured to access the memory 430 and execute computer-executable instructions loaded therein. For example, the processor(s) 422 may be configured to execute computer-executable instructions of the various program modules of the server 120 to cause or facilitate various operations to be performed in accordance with one or more embodiments of the disclosure. The processor(s) 422 may include any suitable processing unit capable of accepting data as input, processing the input data in accordance with stored computer-executable instructions, and generating output data. The processor(s) 422 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 422 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 422 may be capable of supporting any of a variety of instruction sets.

The network interface(s) 424 may be configured to allow the server 120 to communicate with content providers and other entities over networks (e.g., network 420), such as local-area networks (LANs), wide-area networks (WANs), the Internet, wireless networks, wireless wide-area networks (WWANs), cable television networks, satellite television networks, telephone networks, cellular communications networks, combinations of the foregoing, and/or the like. Further, such networks may have any suitable communication range associated therewith and may include, for example, metropolitan area networks (MANs) or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

One or more input/output (I/O) interfaces 426 may be provided that may facilitate the receipt of input information by the server 120 from one or more I/O devices as well as the output of information from the server 120 to the one or more I/O devices. The I/O devices may include, for example, one or more user interface devices that facilitate interaction between a user and the server 120 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The antenna 428 may include any suitable type of antenna(s) depending, for example, on the communications protocols used to transmit or receive signals via the antenna 428. Non-limiting examples of suitable antennas may include directional antennas, non-directional antennas, dipole antennas, folded dipole antennas, patch antennas, multiple-input multiple-output (MIMO) antennas, or the like. The antenna 428 may be communicatively coupled to one or more transceivers or radio components to which or from which signals may be transmitted or received. The antenna 428 of the server 120 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas 428 include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The antenna 428 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna 428 may be configured to transmit or receive radio frequency signals within any suitable frequency range forming part of the unlicensed portion of the radio spectrum.

The server 120 may include a transceiver with any suitable radio component(s) for, in cooperation with the antenna 428, transmitting or receiving radio frequency (RF) signals in the bandwidth and/or channels corresponding to the communications protocols utilized by the server 120 to communicate with other devices. The transceiver may include hardware, software, and/or firmware for modulating, transmitting, or receiving, potentially in cooperation with any of antenna 428, communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver may include any known receiver and baseband suitable for communicating via the communications protocols utilized by the server 120.

The memory 430 may include one or more program modules, applications, or the like, such as an advertising inventory aggregation module 432, an advertising package generation module 434, an audience prediction module 436, an ad impression tracking module 438, and a make good module 440. Any of the modules may include one or more sub-modules. For example, the make good module 440 may include one or more preemption detection modules. Any of the modules depicted in FIG. 6 may include computer-executable code, instructions, or the like that may be loaded into the memory 430 for execution by one or more of the processor(s) 422. Further, any data may be loaded into the memory 430 for use by the processor(s) 422 in executing computer-executable code.

The memory 430 of the server 120 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 430 may include removable and/or non-removable media which may be implemented in any method or technology for storage of information, such as computer-readable instructions, data structures, program modules, or other data.

In various implementations, the memory 430 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 430 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.). Other examples of memory include EEPROM, flash memory, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

Referring now to functionality supported by the various program modules depicted in FIG. 6, the advertising inventory aggregation module 432 may include computer-executable instructions, code, or the like, that, responsive to execution by the processor 422, may cause the server 120 to generate and/or send requests for available advertising inventory to one or more connected advertising seller devices, such as seller server 132. The advertising inventory aggregation module 432 may further cause the server 120 to generate a set of one or more available ad slots in request to a buyer's request for availability.

The advertising package generation module 434 may include computer-executable instructions, code, or the like, that, responsive to execution by the processor 422, may function to generate ad packages in response to requests for availability or requests for ad packages from a buyer device. The advertising package generation module 434 may be configured to select one or more ad slots from a set of available ad slots based at least in part on ad campaign information provided by an advertiser or buyer.

The audience prediction module 436 may include computer-executable instructions, code, or the like, that, responsive to execution by the processor 422, may function to determine a predicted audience for ad slots included in an ad package. The audience prediction module 436 may analyze historical information, third party ratings, present information, pricing, and other information to predict audience information.

The ad impression tracking module 438 may include computer-executable instructions, code, or the like, that, responsive to execution by the processor 422, may function to track serving of one or more ad impressions associated with an ad campaign. The ad impression tracking module 438 may be configured to generate statistics and other performance metrics associated with ad campaigns.

The make good module 440 may include computer-executable instructions, code, or the like, that, responsive to execution by the processor 422, may function to detect preemption events, and to generate make good proposals or suggestions comprising proposed substitute ad slots that may be based at least in part on expected value, price, audience information, or other metrics.

While FIG. 6 illustrates one example device of server 120, it is to be appreciated that the server 120, or any of the buyer device 112 or seller device 132, may be multiple other types of devices and architectures that may be configured to implement the described techniques. For instance, the components illustrated as being located on or accessible to the server 120 may be located in any other location, such as on one or more of servers that are accessible to the device over a network, spread out amongst servers, located on other user devices, and/or the like.

It should further be appreciated that the server 120 may include alternate and/or additional hardware, software, or firmware components beyond those described or depicted without departing from the scope of the disclosure. More particularly, it should be appreciated that software, firmware, or hardware components depicted as forming part of the server 120 are merely illustrative and that some components may not be present or additional components may be provided in various embodiments. While various illustrative program modules have been depicted and described as software or data stored in the memory 430, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Additional Use Cases and Embodiments

Figure 7:
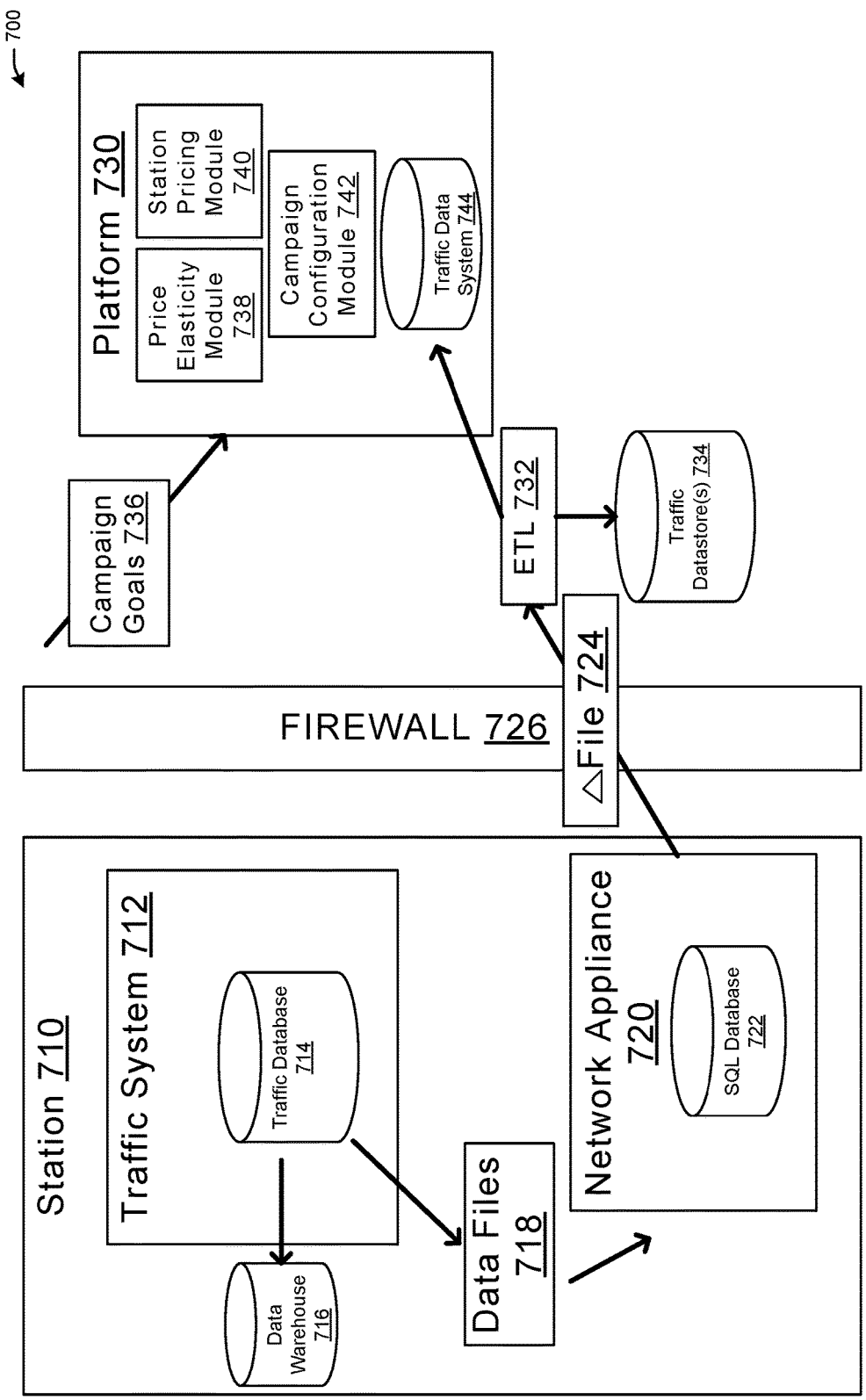
FIG. 7 is a schematic illustration of an example system architecture in accordance with one or more example embodiments of the disclosure.

Referring to FIG. 7, advertisers may desire to present advertisements to a particular target consumer or a target audience. In purchasing television advertising, advertisers may desire to spend an advertising budget in a manner that maximizes the number of consumers falling within the target audience that are presented with the advertiser's respective advertisement. In some instances, advertisers may desire to serve an ad spot to a particular number of people that fall within a target audience.

In one example embodiment in accordance with the disclosure, a traffic system may have an available ad inventory that includes inventory for a limited amount of time or a limited window into the future, which may prevent advertisers or buyers from buying advertising slots that are farther into the future than the traffic system has provided inventory for. For example, a traffic system may provide an advertiser with ad inventory for an upcoming period of three months, or three months from a time at which the advertiser requests the ad inventory information. However, the advertiser may desire to purchase advertising four months into the future and may be prevented from doing so due to the traffic system's failure to provide ad inventory for the desired timeframe.

Embodiments of the disclosure may generate inventory management systems that may include virtual or predicted advertising inventories for one or more television stations. FIG. 7 schematically illustrates an example system 700 in accordance with one or more embodiments of the disclosure. The system may include a network station 710 that communicates with a platform 730 to implement functionality described herein. Stations may implement a number of sales strategies, such as program sales for particular programming, time period block sales, or package sales, which may focus on sports or other special programming. Stations may implement sales strategies to meet revenue goals, in one example. The network station 710 may include a traffic system 712 with a traffic database 714. The traffic system 712 may be a local, regional, or national traffic system or may be a network affiliate traffic system. The traffic database 714 may include traffic system specific information, such as scheduling, programming, ad inventory, sold ad inventory, and other information. The traffic database 714 may be in communication with a data warehouse 716 that serves as a central data storage location for one or more traffic systems. The traffic system 712 may generate data files 718 that may include data related to ad inventory and scheduling, sold ads, historical scheduling or programming, client information, and other information.

A network appliance 720 may be installed at the station 710, for example at a station server. The network appliance 720 may include an SQL database 722 and may be configured to receive the data files 718. Upon receiving the data files 718, the network appliance 720 may be configured to generate a delta file 724 periodically, where the delta file 724 indicates a change in status since a last delta file was generated. For example, the delta file 724 may be generated nightly and may include data related to ad inventory that was sold since the previous night, or ad inventory that has become available since the last delta file was generated, or programming changes (e.g., special programming like Presidential addresses or seasonal specials). Delta files may be generated automatically and/or periodically, such as every night, or upon request.

The network appliance 720 may be configured to bypass a firewall 726 that protects data or information being sent or received by the station 710. The network appliance 720 may be configured to utilize particular ports in sending or receiving information, such as the delta file 724. The network appliance 720 may send the delta file 724 to the platform 730. The delta file 724 may be processed through an Extract, Translate, and Load (ETL) engine 732 configured to extract data from the delta file 724. The ETL engine 732 may be configured to distill the information in the delta file 724. Information extracted by the ETL engine 732 may be stored at a traffic datastore 734. The traffic datastore 734 may be specific to the station 710 or may include multiple stations and/or traffic system information.

The platform 730 may further receive campaign goals 736 from buyers or advertisers that indicates goals of an ad campaign, such as a number of desired viewers within a particular age range.

Based at least in part on the ETL engine output and the campaign goals 736, the platform 730 may generate ad packages, ad ratings, pricing, and other information. For example, the platform 730 may include a price elasticity module 738, a station pricing module 740, a campaign configuration module 742, and a traffic data system 744. The price elasticity module 738 may include computer-executable instructions configured to optimize pricing for certain ad inventory. For example, ad inventory that remains unsold for a particular length of time may have pricing adjustments based on calculations performed by the pricing elasticity module 738. The pricing elasticity module 738 may further be configured to generate client-specific pricing by analyzing client purchase history or ad purchases. Pricing may be determined based at least in part on program context and/or seasonality, such as sports programming, specials, and other context and/or seasonality. The station pricing module 740 may include computer-executable instructions configured to determine a price for ad inventory available at a particular station, such as the station 710. The campaign configuration module 742 may include computer-executable instructions configured to receive campaign inputs and parameters from a buyer or advertiser, and may further be configured to identify ad inventory related to the campaign goals. The traffic data system 744 may be configured to generate current and predicted ad inventory and may store information related to specific station programming and ad inventory.

In some embodiments, the platform 730 may include other modules, such as an inventory management module(s) configured to facilitate inventory configuration and implement station strategy, an inventory projection module(s) configured to generate virtual inventory, and a rating module (s) configured to generate ratings for television programs, ad packages, and other components.

Figure 8:
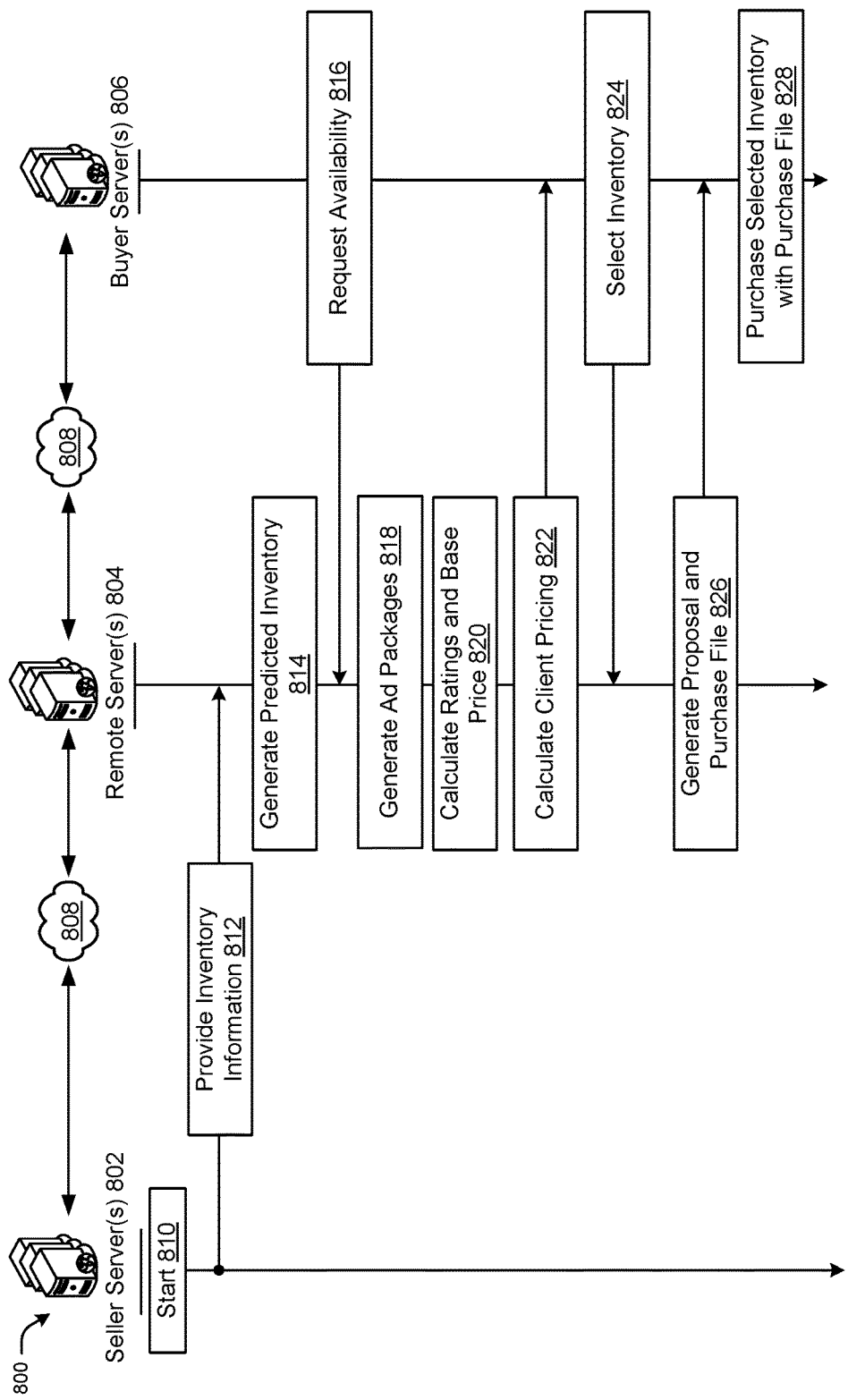
FIG. 8 is an example process flow in accordance with one or more example embodiments of the disclosure.

Referring to FIG. 8, an example process flow 800 is illustrated in accordance with one or more embodiments of the disclosure. The process flow 800 depicts one example embodiment of the disclosure that includes a seller server 802, a remote server 804, and a buyer server 806 in communication via one or more network(s) 808.

In FIG. 8, the process flow 800 may begin at 810. The seller server 802 may send inventory information to the remote server 804 at communication 812. The remote server 804, which may be a platform or server as described herein, may receive the inventory information, which may include a set of available ad inventory from the seller server 802, which may be a traffic system server. The set of available ad inventory may include ad inventory available for a first future time period, which may be a predetermined length of time, such as 13 weeks. The set of available ad inventory may be received from a hardware component in communication with the traffic system server. The hardware component may be a network appliance installed at the traffic system server that is configured to bypass a firewall at the station server. The set of available advertisement inventory may include pricing information for sold inventory and unsold inventory for any time period, such as the first future time period. The remote server 804 may further receive a traffic system schedule indicative of planned television programming and historical television programming by the traffic system server. The historical television programming may include historical television programming, such as the previous 12, 24, 36 or any other number of months necessary to establish a historical base from historical television programming by the traffic system associated with the traffic system server.

Upon receiving the available ad inventory and the traffic system schedule, the remote server may generate predicted inventory 814. For example, the remote server 804 may identify a futuremost ad in the ad inventory. The futuremost ad may represent an end of the first future time period, or an available ad that is furthest in time from the point in time at which the available ad inventory was determined (e.g., the end of the predicted schedule in the system). For example, if the available ad inventory includes inventory for a period of four weeks, the futuremost ad may be the last available ad, or the last ad available at the end of the four week period. The remote server 804 may determine that a correlation between a previous traffic system schedule portion selected from the historical television programming and the planned television programming meets an inventory prediction threshold. A previous traffic system schedule portion may be a day of scheduling, a week of scheduling, or another portion of the historical traffic system scheduling for a historical time period. For example, the previous traffic system schedule portion may be scheduling during the month of April in a previous year. The planned television programming may be for the month of April in a current year, and the remote server 804 may analyze the planned television programming and the historical portion to determine a correlation or match between the respective schedules. For example, the remote server 804 may compare planned scheduling for upcoming June 2015 to previous scheduling during June 2014 to determine a correlation. The correlation may be compared to an inventory prediction threshold that indicates a level of similarity between the future and past scheduling. The level of similarity may be based on time blocks of programs and/or ad slots, programming, such as length and titles, ad slot positioning, or other similarity metrics. The inventory prediction threshold may be fixed or adjustable and may represent a confidence interval that scheduling from the previous time period is likely to be repeated in future scheduling at a traffic system. The inventory prediction threshold may be dynamic in that a likelihood of scheduling accuracy for time periods closer to present time may have a lower inventory prediction threshold (and therefore a higher confidence interval) than scheduling accuracy for time periods further into the future. In some embodiments, in terms of audience demographics, the platform may not look solely to similar year-over-year periods, but also to recent trends. For example, a show or programming may be gaining or losing audience in a period immediately leading up to the ad spot, which may be different from the behavior the prior year.

In some instances, advertisers may desire to book ad slots further in advance of available inventory, or in advance of future inventory information that is available to the traffic system. In such instances, upon determining that a correlation between a previous traffic system schedule portion selected from the historical television programming and the planned television programming meets an inventory prediction threshold, the remote server 804 may identify a previous advertising inventory based at least in part on the previous traffic system schedule portion, and may generate a predicted advertisement inventory indicative of advertisement inventory at the traffic system server after the first future time period included in the set of available advertisement inventory based at least in part on the set of available advertisement inventory and the traffic system schedule. For example, the remote server 804 may identify advertising inventory included in the historical scheduling at the traffic system, and may generate predicted ad inventory for a second future first time period that corresponds to the historical ad inventory. Specifically, the remote server 804 may generate a first predicted advertisement inventory indicative of advertisement inventory at the traffic system server for a second future time period that is after the end of the first time period, based at least in part on the previous advertising inventory.

At communication 816, the remote server 804 may receive an availability request for ad inventory available after the end of the first future time period at the seller server 802 or another traffic system server, for example, from the buyer server 806 or an advertiser that desires to serve an ad spot. The availability request may include one or more advertiser goals, such as a target audience, a target number of viewers, a desired network affiliate, a desired program, time block, daypart, or other advertiser selections or goals. The availability request may include a target audience for an advertisement campaign of a buyer. In response to the availability request, the remote server 804 may generate one or more ad packages 818. In one example, the remote server 804 may identify a first ad slot in the predicted advertisement inventory that is available for purchase, and may present the first ad slot in response to the availability request. The first ad slot may be identified based at least in part on the availability request from the advertiser. The remote server 804 may identify an advertising slot in the predicted advertisement inventory relevant to the buyer based at least in part on the target audience, wherein the advertising slot meets a confidence interval threshold indicative of a match between viewership of television programming with the advertising slot and the target audience. The confidence interval may correspond to a likelihood that members of the target audience will view the television programming during which the ad slot is to be presented. In one example, the remote server 804 may identify a television program during which the advertising slot is to be served, and may analyze first viewership data associated with the television program. The remote server 804 may determine a daypart associated with the television program, and may analyze second viewership data associated with the daypart.

Embodiments of the disclosure may add value to ad campaigns by comparing an advertiser's campaign goals to available inventory, and identifying particular inventory that may have relatively lower ratings and/or smaller audiences, but still align with the campaing goals. In some embodiments, the remote server 804 may generate ratings and base price for the ad packages at operation 820. For example, the remote server 804 may determine a weighted advertisement rating for one or more available ad slots based at least in part on viewership of the respective programming. The weighted advertisement rating may be specific to advertiser goals or desired viewership and/or target audience. In one example, the remote server 804 may determine viewership of a television program during which the ad slot is to be served by identifying one or more of a majority demographic of viewers, a majority age range of viewers, a number of viewers, a majority type of viewer, or a combination thereof. Weighted advertisement ratings may be presented with the available ad inventory.

Some embodiments of the disclosure may provide indications of special value to advertisers or buyers. For example, a program may have a low Nielsen rating, but may have an exact match to an advertisers target audience. Embodiments of the disclosure may provide indications in such instances. In one example, the remote server may determine that an advertising slot has a relatively low viewership rating and a relatively high relevance to the target audience, and may present a value indication to the buyer indicating a value purchase. The value purchase may indicate that the advertising is cheaper than other advertising yet yields a disproportionate number of target audience members in the projected viewership.

At operation 820, the remote server 804 may generate pricing for one or more ad slots or an ad package presented to the buyer. The remote server 804 may identify a base price for the portion selected by the buyer based at least in part on a historical pricing over a first time period for the selected portion. The historical pricing may include pricing for the same ad slot or a similar ad slot (e.g., presented during a similar daypart or programming, etc.) during a prior time period, such as a previous year. The base price may be based at least in part on the weighted advertisement rating and/or the relevance of the portion to the advertiser goals in some embodiments.

In some embodiments, the remote server 804 may adjust the identified base price for the portion based at least in part on the weighted advertisement rating and a purchase history of the buyer to generate a final price at operation 822, for client specific pricing. For example, a purchase history of advertising purchases by the buyer may be factored into base price adjustments to generate buyer-specific pricing. In one example, pricing may be reduced for buyers that previously were presented with ad packages where the buyer did not purchase any advertising, and pricing may be increased for buyers that routinely purchase advertising.

Based at least in part on the final price, the remote server 804 may generate multiple tiers of pricing. Tiers may represent buyer control over when an ad spot is actually served. For example, a first tier may guarantee that the buyer's ad will be served at the presented ad slot, while a fourth tier may only guarantee that the buyer's ad will be served, but not at a particular media station or during a certain program. However, some tiers may be preferable to certain buyers that simply want to reach a certain target audience and do not have time or program constraints. Some buyers, such as political advertisers, may have time constraints, such as elections, and may therefore desire additional control or guarantees over when their respective ad spots will be served. Accordingly, the remote server 804 may generate a first tier price for the selected portion based at least in part on the final price, where the first tier price includes fixed advertisement scheduling. The remote server 804 may further generate a second tier price for the selected portion based at least in part on the final price, where the second tier price comprises flexible advertisement scheduling. The second tier price may be less than or greater than the first tier scheduling. The second tier may guarantee that the ad spot will be served to a certain number of viewers within the advertiser's target audience, but may not guarantee certain times or programs during which the ad spot will be served. The remote server may present the first tier price and the second tier price for the portion to the buyer, along with the set of available ad inventory to the buyer in response to the availability request.

The set of available advertisement inventory and the predicted advertisement inventory may be presented in response to the availability request. In some embodiments, the identified advertising slot may be highlighted or otherwise indicated as relevant to at least one of the advertiser's goals. In one example, the remote server may present the advertising slot with an identifying marker corresponding to the relevance between the advertising slot and the target audience. The identifying marker may be a colored graphical indication highlighting the advertising slot. Colored graphical indications may correspond to the relevance of the predicted viewership of television programming during which the ad slot is to be presented. For example, a red color may indicate a relatively low likelihood of reaching a target audience, while a green color may indicate a relatively high likelihood of reaching a target audience. Color intensity may also be used to distinguish between ad inventory (e.g., dark green may indicate a higher confidence than light green, etc.).

At communication 824, the remote server 804 may receive a selection of either the first tier price or the second tier price for purchase of an ad slot and/or the selected portion from the buyer server 806. In instances where the first tier price is selected, the remote server 804 may present a confirmation notification indicating a guaranteed serving of the ad spot during one of a specific television program, a specific time block, or a specific traffic system server. In instances where the second tier price is selected, the remote server 804 may present a confirmation notification indicating that the ad spot will be presented to a predicted number of members of the target audience, where the serving of the ad is flexible. Certain embodiments may also include a third or subsequent tier price for example, for advertisers that are less concerned with programming or rescheduling of ad slots.

The remote server 804 may receive a purchase request for a portion of the predicted advertisement inventory to serve an advertisement spot of the advertising campaign. The portion selected by the buyer may include the advertising slot and/or advertising during one of a television program, a time block, or an advertisement package.

In response to the purchase request, the remote server 804 may generate a purchase file 826 including one or more advertisement slots and the portion of the predicted advertisement inventory selected by the buyer. The purchase file may be used by the buyer to place an order for the ad slots using a third party order placing service at operation 828. The purchase file may be compatible with multiple third party servers. The remote server may send the purchase file to a buyer device associated with the buyer. The buyer device may receive the purchase file and use the purchase file to order or buy the advertising.

In some instances, pricing for advertising may change after an initial buy or order takes place. For example, ad slots during a television program that dramatically increases in viewership over time may be more valuable, and therefore more expensive, than the same ad slots before the increase in viewership. In such instances, ad slots that were previously sold may be preempted by other advertiser ads that are willing to pay more for the same ad slot. To avoid preemption events, and to achieve true market pricing, embodiments of the disclosure may automatically adjust or correct pricing for advertising. In the embodiment of FIG. 8, the remote server may identify a second weighted advertisement rating for the at least one available ad slot, and may determine that the second weighted advertisement rating exceeds the first weighted advertisement rating. For example, viewership of the program during which the ad slot is to be served may have increased dramatically, or the program may have become a hit show. Accordingly, the remote server may send a price correction notification indicating that the selected first tier price or second tier price has increased, or has been otherwise adjusted.

In some instances, advertising may be sold so far in advance that determining a true market value of the advertising may be difficult to determine. Embodiments of the disclosure may automatically correct pricing as confidence intervals in pricing increase and/or as the advertising slots approach present time. In FIG. 8, the remote server may determine a length of time between receiving the availability request and an air time at which the at least one available ad slot is to be served. The remote server may determine a price adjustment likelihood based at least in part on the length of time, where the price adjustment likelihood represents a likelihood either the first tier price or the second tier price will change before the air time. The price adjustment likelihood may be a confidence interval or numerical value indicative of a chance that the price may be adjusted. In some instances, ad slots sold far in advance of scheduled airing (e.g., beyond the constraints of the traffic system) may be sold at a premium to hedge against underpricing. As a result, pricing may be determined so as to increase revenue for the seller (due to uncertainty of the market), while protecting the buyer, who may receive assurances of certain ad spots while paying than tier 1 pricing.

In instances where a buyer selects non-first tier pricing, or when the buyer selects flexible scheduling, ad slots may be preempted. Embodiments of the disclosure may automatically reschedule preempted advertising slots in comparable advertising slots by implementing make good rules, as described herein. In one example, the remote server may receive a preemption notification indicating that an ad spot was not served during a scheduled ad slot. The remote server may identify a replacement advertisement slot during which to serve the ad spot, where the replacement advertisement slot meets a confidence interval threshold such that the target audience and viewership goals of the advertiser are satisfied, and the remote server may automatically reschedule the ad spot for serving during the replacement advertisement slot.

Although specific embodiments of the disclosure have been described, one of ordinary skill in the art will recognize that numerous other modifications and alternative embodiments are within the scope of the disclosure. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component including assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

receiving, by a computer system comprising one or more processors coupled to at least one memory, a set of available advertisement inventory from a traffic system server, the set of available advertisement inventory comprising pricing information for sold inventory and unsold inventory for a time period of thirteen weeks, wherein the set of available advertisement inventory is received from a network appliance installed at the traffic system server and configured to bypass a firewall at the traffic system server;

receiving, by the computer system, a traffic system schedule indicative of planned television programming and historical television programming by the traffic system server, wherein the historical television programming comprises at least one year of historical television programming;

generating, by the computer system, a predicted advertisement inventory indicative of advertisement inventory at the traffic system server after the time period of thirteen weeks included in the set of available advertisement inventory based at least in part on the set of available advertisement inventory and the traffic system schedule;

receiving, by the computer system, an availability request for advertising inventory available at the traffic system server, the availability request comprising a target audience for an advertisement campaign of a buyer;

identifying, by the computer system, an advertising slot in the predicted advertisement inventory relevant to the buyer based at least in part on the target audience, wherein the advertising slot meets a confidence interval threshold indicative of a match between viewership of television programming comprising the advertising slot and the target audience;

presenting, by the computer system, the set of available advertisement inventory and the predicted advertisement inventory in response to the availability request, wherein the advertising slot is highlighted;

receiving, by the computer system, a purchase request for a portion of the predicted advertisement inventory to serve an advertisement spot of the advertising campaign, wherein the portion comprises the advertising slot and advertising during one of a television program, a time block, or an advertisement package;

identifying, by the computer system, a base price for the portion based at least in part on a historical pricing over a first time period for the portion;

generating, by the computer system, a weighted advertisement rating for the portion based at least in part on viewership of the portion;

adjusting, by the computer system, the base price for the portion based at least in part on the weighted advertisement rating and a purchase history of the buyer to generate a final price;

generating, by the computer system, a first tier price for the portion based at least in part on the final price, wherein the first tier price comprises fixed advertisement scheduling;

generating, by the computer system, a second tier price for the portion based at least in part on the final price, wherein the second tier price comprises flexible advertisement scheduling;

presenting, by the computer system, the first tier price and the second tier price for the portion to the buyer;

receiving, by the computer system, a selection of the second tier price for purchase of the portion;

identifying, by the computer system, the advertisement slot of the portion of the predicted advertisement inventory during which to serve the advertisement spot;

receiving, by the computer system, a delta file from the network appliance comprising a change in the set of available advertisement inventory at the traffic system server;

converting, by the computer system, the advertisement slot from the predicted advertisement inventory to a confirmed advertisement inventory based at least in part on the delta file;

generating, by the computer system, a purchase file comprising the advertisement slot and the portion of the predicted advertisement inventory;

sending, by the computer system, the purchase file to a buyer device associated with the buyer;

receiving, by the computer system, a preemption notification indicating that the advertisement spot was not served during the advertisement slot;

identifying, by the computer system, a replacement advertisement slot in the predicted advertisement inventory during which to serve the advertisement spot, wherein the replacement advertisement slot meets the confidence interval threshold; and automatically rescheduling, by the computer system, the advertisement spot for serving during the replacement advertisement slot.

2. A method comprising:

receiving, by a computer system comprising one or more processors coupled to at least one memory, a set of available ad inventory from a traffic system server, the set of available ad inventory comprising inventory available for a first future time period, wherein the set of available ad inventory is received from a hardware component in communication with the traffic system server;

identifying, by the computer system, a futuremost ad in the ad inventory representing an end of the first future time period;

receiving, by the computer system, a traffic system schedule indicative of planned television programming and historical television programming by the traffic system server;

determining, by the computer system, that a correlation between a previous traffic system schedule portion selected from the historical television programming and the planned television programming meets an inventory prediction threshold;

identifying, by the computer system, a previous advertising inventory based at least in part on the previous traffic system schedule portion;

generating, by the computer system, a first predicted advertisement inventory indicative of advertisement inventory at the traffic system server for a second future time period after the end of the first future time period based at least in part on the previous advertising inventory;

receiving, by the computer system, a delta file from the hardware component comprising an inventory change in the set of available ad inventory at the traffic system server, wherein the delta file further includes a first ad slot available during the second future time period;

identifying, by the computer system, the first ad slot in the first predicted advertisement inventory;

converting, by the computer system, the first ad slot from the first predicted advertisement inventory to a confirmed advertisement inventory based at least in part on the delta file; and generating, by the computer system, a second predicted advertisement inventory comprising a second predicted ad slot in a third future time period after the second future time period, such that the second predicted advertisement inventory has a second length equal to a first length of the first predicted advertisement inventory.

3. The method of claim 2, further comprising:

receiving, by the computer system, an availability request for ad inventory available after the end of the first future time period at the traffic system server;

identifying, by the computer system, a first ad slot in the predicted advertisement inventory that is available for purchase; and presenting, by the computer system, the first ad slot in response to the availability request.

4. The method of claim 2, wherein:
the set of available ad inventory comprises pricing information for sold inventory and unsold inventory;
the first future time period is thirteen weeks;
the hardware component is a network appliance installed at the traffic system server and configured to bypass a firewall at the traffic system server; and
the historical television programming comprises at least one year of historical television programming.

5. A method comprising:
receiving, by a computer system comprising one or more processors coupled to at least one memory, an availability request from a buyer for available ad inventory during which to serve an ad spot;
identifying, by the computer system, a set of available ad inventory comprising at least one available ad slot at one or more traffic system servers;
identifying, by the computer system, a base price for the at least one available ad slot based at least in part on a historical pricing over a first time period for the at least one available ad slot;
generating, by the computer system, a first weighted advertisement rating for the at least one available ad slot based at least in part on viewership of a television program during which the at least one available ad slot is to be served;
adjusting, by the computer system, the base price for the at least one available ad slot based at least in part on the weighted advertisement rating to generate a final price;
generating, by the computer system, a first tier price for the at least one available ad slot based at least in part on the final price, wherein the first tier price comprises fixed advertisement scheduling;
generating, by the computer system, a second tier price for the at least one available ad slot based at least in part on the final price, wherein the second tier price comprises flexible advertisement scheduling; and
presenting, by the computer system, the set of available ad inventory, the first tier price, and the second tier price to the buyer in response to the availability request.

6. The method of claim 5, further comprising:
adjusting, by the computer system, the base price for the at least one available ad slot based at least in part on a purchase history of the buyer to generate the final price, wherein the final price is specific to the buyer.

7. The method of claim 5, wherein generating the weighted advertisement rating comprises:
determining viewership of the television program by identifying one or more of a majority demographic of viewers, a majority age range of viewers, a number of viewers, a majority type of viewer, a household income, or a combination thereof.

8. The method of claim 5, further comprising:
receiving, by the computer system, a selection of either the first tier price or the second tier price for purchase of the at least one available ad slot;
identifying, by the computer system, a second weighted advertisement rating for the at least one available ad slot after receiving the selection;
determining, by the computer system, that the second weighted advertisement rating exceeds the first weighted advertisement rating; and
sending, by the computer system, a price correction notification indicating that the selected first tier price or second tier price has increased.

9. The method of claim 5, further comprising:
determining, by the computer system, a length of time between receiving the availability request and an air time at which the at least one available ad slot is to be served;
determining, by the computer system, a price adjustment likelihood based at least in part on the length of time, wherein the price adjustment likelihood represents a likelihood either the first tier price or the second tier price will change before the air time.

10. The method of claim 5, wherein the availability request comprises a target audience for an advertisement campaign of the buyer and wherein the at least one available ad slot is identified based at least in part on the target audience, wherein the at least one available ad slot meets a confidence interval threshold indicative of a match between viewership of television programming comprising the at least one available ad slot and the target audience.

11. The method of claim 5, further comprising:
receiving, by the computer system, a selection of the first tier price for purchase of the at least one available ad slot; and
presenting, by the computer system, a confirmation notification comprising a guaranteed serving of the ad spot during one of a specific television program, a specific time block, or a specific traffic system server.

12. The method of claim 5, further comprising:
receiving, by the computer system, a selection of the second tier price for purchase of the at least one available ad slot;
receiving, by the computer system, a preemption notification indicating that the ad spot was not served during the at least one available ad slot;
identifying, by the computer system, a replacement advertisement slot during which to serve the ad spot, wherein the replacement advertisement slot meets the confidence interval threshold; and
automatically rescheduling, by the computer system, the ad spot for serving during the replacement advertisement slot.

13. A method comprising:
receiving, by a computer system comprising one or more processors coupled to at least one memory, an availability request for advertising inventory, the availability request comprising a target audience for an advertisement campaign of a buyer, and a first traffic system server identifier;
identifying, by the computer system, a set of available ad inventory comprising available ad slots at one or more traffic system servers;
identifying, by the computer system, an advertising slot in the set of available ad inventory relevant to the buyer based at least in part on the target audience, wherein the advertising slot meets a confidence interval threshold indicative of a match between viewership of television programming comprising the advertising slot and the target audience;
presenting, by the computer system, the set of available advertisement inventory to the buyer in response to the availability request, wherein the advertising slot is presented with an identifying marker corresponding to the relevance between the advertising slot and the target audience, wherein the identifying marker is a colored graphical indication and a color of the colored graphical indication corresponds to the confidence interval;

determining, by the computer system, that the advertising slot has a relatively low viewership rating and a relatively high relevance to the target audience; and presenting, by the computer system, a value indication to the buyer indicating a value purchase.

14. The method of claim 13, wherein identifying the advertising slot in the set of available ad inventory relevant to the buyer based at least in part on the target audience comprises:

identifying, by the computer system, a television program during which the advertising slot is to be served;

analyzing, by the computer system, first viewership data associated with the television program;

determining, by the computer system, a daypart associated with the television program; and analyzing, by the computer system, second viewership data associated with the daypart.

15. The method of claim 13, wherein the identifying marker is a colored graphical indication highlighting the advertising slot.

* * * * *